(12) United States Patent
Walker

(10) Patent No.: US 9,265,391 B2
(45) Date of Patent: Feb. 23, 2016

(54) APPARATUS FOR COLLECTION OF GARDEN WASTE

(71) Applicant: BLACK & DECKER INC., Newark, DE (US)

(72) Inventor: Andrew Walker, Durham (GB)

(73) Assignee: BLACK & DECKER INC., Newark, DE (US)

( * ) Notice: Subject to any disclaimer, the term of this patent is extended or adjusted under 35 U.S.C. 154(b) by 406 days.

(21) Appl. No.: 13/741,774

(22) Filed: Jan. 15, 2013

(65) Prior Publication Data

US 2013/0185892 A1    Jul. 25, 2013

(30) Foreign Application Priority Data

Jan. 23, 2012    (EP) ..................... 12152175

(51) Int. Cl.
  *A47L 5/14*    (2006.01)
  *A47L 5/24*    (2006.01)
  *A01G 1/12*    (2006.01)
(52) U.S. Cl.
  CPC . *A47L 5/14* (2013.01); *A01G 1/125* (2013.01); *A47L 5/24* (2013.01)
(58) Field of Classification Search
  CPC .................................. A47L 5/14; A47L 5/24
  USPC ................................................. 15/330, 344
  See application file for complete search history.

(56) References Cited

U.S. PATENT DOCUMENTS

| | | | | | |
|---|---|---|---|---|---|
| 5,535,479 | A | * | 7/1996 | Pink et al. ........................ | 15/410 |
| 5,604,954 | A | * | 2/1997 | Webster et al. .................. | 15/330 |
| 5,659,920 | A | * | 8/1997 | Webster et al. .................. | 15/344 |
| 5,979,013 | A | * | 11/1999 | Beckey et al. ................... | 15/326 |
| 6,000,096 | A | * | 12/1999 | Everts et al. ..................... | 15/330 |

FOREIGN PATENT DOCUMENTS

| | | | |
|---|---|---|---|
| CN | 1994213 B | * | 5/2010 |
| EP | 2198766 | | 6/2010 |

OTHER PUBLICATIONS

EP Search Report dated Jul. 11, 2012.

* cited by examiner

*Primary Examiner* — Dung Van Nguyen
(74) *Attorney, Agent, or Firm* — John Yun

(57) ABSTRACT

An apparatus for collection of garden waste wherein the apparatus has a vacuuming mode of operation and a dirty fan operation in the vacuuming mode of operation thereof, the apparatus comprising: a hand-holdable unit comprising a motor with an output shaft coupled to an impeller for generation of air flow; a volute enclosing the impeller for direction of air flow from an axial air inlet of the volute past the impeller to a tangential air outlet of the volute; a vacuum tube for conducting dirty air flow to the air inlet of the volute in the vacuuming mode of operation; and a cyclonic separation arrangement for receiving dirty air flow from the air outlet of the volute and separating garden waste from said dirty air flow in the vacuuming mode of operation. A blowervac comprising the apparatus for collection of garden waste.

14 Claims, 10 Drawing Sheets

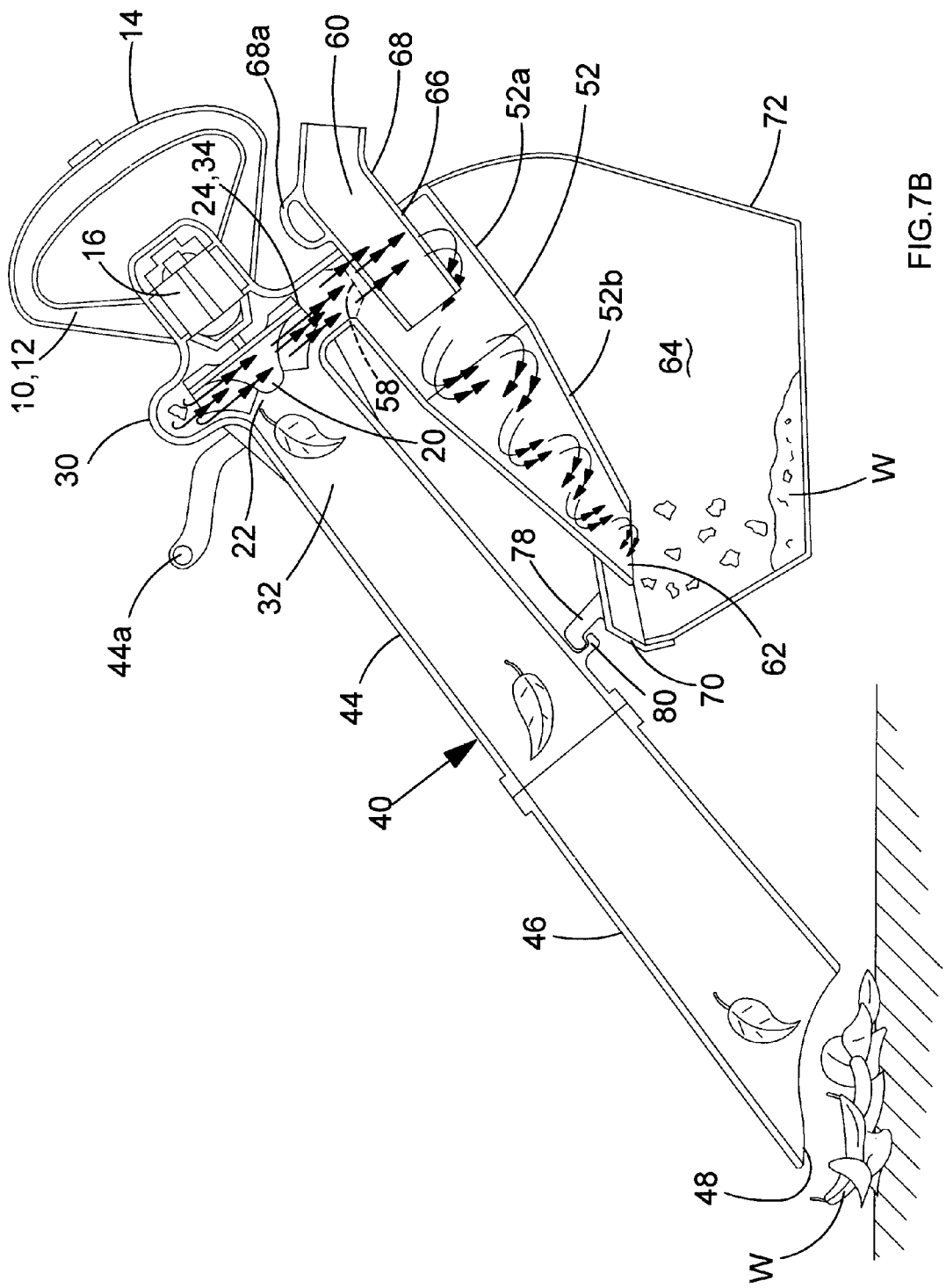

APPARATUS FOR COLLECTION OF GARDEN WASTE

CROSS-REFERENCE TO RELATED APPLICATIONS

This application claims priority to European Patent Application No. 12152175.1 filed Jan. 23, 2012. The entire contents of that application are expressly incorporated herein by reference.

FIELD OF THE INVENTION

The present invention concerns an apparatus for collection of garden waste used for collecting garden waste such as leaves, grass cuttings and twigs. More particularly, the present invention concerns apparatus for collection of garden waste having a vacuuming mode of operation with a dirty fan. The meaning of the term "dirty fan" will be explained in detail below.

BACKGROUND OF THE INVENTION

Apparatus for collection of garden waste for use in the garden are well known. One type of device comprising an apparatus for collection of garden waste is a blower-vacuum device, commonly referred to as a "blowervac". Blowervacs generally comprise a motor having an output shaft coupled to a fan. The motor is usually either petrol or electrically powered. The fan is usually enclosed within a volute. The fan is configured to draw air in along its axis of rotation and expel air out tangentially when the fan is driven by the motor. Fans having such a configuration are properly called centrifugal impellers. The exterior of the volute has a generally disc-shaped appearance. The volute is provided with both an air inlet generally aligned with the impeller's axis of rotation and at least one air outlet located at a point on the periphery of the volute. The interior of the volute is spiral-shaped to enable the flow of air generated by the fan in operation in the air inlet and out the air outlet. As their name implies, blowervacs have two modes of operation: blowing and vacuuming.

In the blowing mode of operation, clean air is drawn into the volute from the atmosphere via the air inlet thereto and is expelled via the air outlet. A blowing tube is attached to the air outlet in order to concentrate and direct the expelled air into a jet, which may be aimed in different directions by pointing the blowing tube as desired.

In the vacuuming mode of operation, garden waste may be collected up a vacuum tube connected to the blowervac in one of two ways, usually known as "clean fan" and "dirty fan" operation. In clean fan operation of a blowervac in vacuuming mode, clean air is drawn into the volute from the atmosphere via the air inlet thereto in the same manner as for blowing operation and the air expelled from the volute through the air outlet thereof is directed towards a collection device or receptacle.

Typically, the receptacle is porous to the passage of air therethrough and is also fed by the vacuum tube with air from ground level. Air passing into the receptacle from the volute therefore causes air to be sucked up the vacuum tube as well. Garden waste entrained with the air passing up the vacuum tube is collected in the receptacle without passing through the fan; hence, clean fan operation. In contrast, in dirty fan operation, an air-porous receptacle for garden waste is attached directly to the air outlet from the volute and the vacuum tube is instead attached to the air inlet thereto. In this latter case, air flow with entrained garden waste (i.e. dirty air flow) passes up the vacuum tube, enters the volute via the air inlet thereto and collides with the fan, before being expelled via the air outlet of the volute into the receptacle; hence, dirty fan operation. Collision of the garden waste with the fan causes the fan to mulch, or chop, the garden waste into smaller particles. Since garden waste mulched in this fashion contains far fewer air pockets than unmulched garden waste, the volume ratio of unmulched to mulched garden waste can be as much as 10:1. The garden waste receptacle can store a larger mass of garden waste in the same volume once it has been mulched than of unmulched waste.

A conventional blowervac providing dirty fan operation in the vacuuming mode thereof is described in U.S. Pat. No. 5,535,479 assigned to The Toro Company. FIG. 3 of U.S. Pat. No. 5,535,479 shows the blowervac thereof in the blowing mode of operation and FIG. 4 of this patent document shows the blowervac thereof in the vacuuming mode of operation with a dirty fan. The blowervac of U.S. Pat. No. 5,535,479 has an impeller permanently enclosed within a volute which may be used interchangeably with separable blowing and vacuum tubes.

A second conventional blowervac providing dirty fan operation in the vacuuming mode thereof is described in European patent publication No. 0 723 758 of Black & Decker Inc. FIG. 1 of EP 0 723 758 shows the blowervac thereof in the blowing mode of operation and FIG. 2 of this patent document shows the blowervac thereof in the vacuuming mode of operation with a dirty fan. FIG. 3 of this patent document shows an embodiment of the blowervac thereof convertible between a blowing mode of operation and a vacuuming mode of operation with a dirty fan. As may be seen from these three figures, the blowervac is provided with one or more different detachable volutes for use in the blowing and vacuuming modes of operation. The detachable volutes may be formed integrally with blowing and vacuum tubes as shown in FIGS. 1 and 2, respectively, of this document, or as a single detachable volute which may be used interchangeably with separable blowing and vacuum tubes as shown in FIG. 3. The blowervac of this patent document may be converted to clean fan operation in the vacuuming mode as is shown in FIG. 4 thereof.

The blowervacs of U.S. Pat. No. 5,535,479 and EP 0 723 758 suffer from certain disadvantages as follows. Firstly, the bag does not filter all the garden waste from the air because it allows some of it, particularly smaller sized matter such as dust, to pass through the wall of the bag to open atmosphere. This is a particular problem when the bag is located against, or in close proximity to, the body of a user. Garden waste, particularly dust, is expelled from the collection bag onto the body of the user, which is undesirable as it may dirty the user's clothing.

When the garden waste is wet, additional moisture is also able to pass through the walls of the bag, thus wetting the clothing of the user. If the moisture is mixed with some of the garden waste, such as dust, which is able to pass through the walls of the bag, it can stain the user's clothing.

The garden waste, particularly when wet, can clog the pores of the bag, thus reducing the porosity of the walls of the bag. This reduces the effectiveness of the collection bag as a filter and hence the performance of the device as a whole.

Another type of device comprising an apparatus for collection of garden waste is described in European patent publication No. 1 042 980 of Black & Decker Inc. FIG. 2 of EP 1 042 980 shows a vacuum cleaner for collection of garden waste which, unlike a blowervac, only has a vacuuming mode of operation. Air flows, together with entrained garden waste, along a vacuum tube in a direction indicated by Arrows A to an axial inlet of the fan having dirty fan operation. The fan mulches entrained garden waste and generates rotational movement of both the air and mulched garden waste about a toroidal chamber in a direction indicated by Arrows B. The garden waste is pushed by air flow away from the fan and along the length of the toroidal chamber in an axial direction indicated by Arrows C. The garden waste and some air flow enter a collection device equipped with an air return pipe to the vacuum tube. The remainder of the air flows through a toroidal outlet, also in the direction indicated by Arrows C.

The vacuum cleaner of EP 1 042 980 suffers from certain disadvantages as follows. The vacuum tube has a cross-sectional area which is large enough to suck garden waste such as leaves. The vacuum tube is surrounded by the toroidal air outlet which is surrounded by the toroidal chamber which, according to FIGS. 1 and 2, has an outer diameter approximately five times greater than that of the vacuum tube. This adds significant bulk to the device which makes it difficult to handle. Further, some of the air flow from the impeller is diverted towards a corner of the toroidal chamber from where its only escape is to the collection device via a small outlet duct. Restriction of air flow in this manner causes turbulence and increases energy losses. Also, the air flow is recycled, via the air return pipe, into the vacuum tube in case it re-entrains garden waste from the collection device. The recycled air flow reduces suction force at the tip of the vacuum tube which diminishes the device's ability to pick up new garden waste. Furthermore, air flow which is not so recycled is instead directed towards the tip of the vacuum tube. This further diminishes the device's ability to pick up garden waste by blowing it away from the tip of the vacuum tube.

BRIEF SUMMARY OF THE INVENTION

An object of the present invention is to provide an improved apparatus for collection of garden waste. Accordingly, in a first aspect of the present invention there is provided an apparatus for collection of garden waste wherein the apparatus has a vacuuming mode of operation and a dirty fan operation in the vacuuming mode of operation thereof, the apparatus comprising: a hand-holdable unit comprising a motor with an output shaft coupled to an impeller for generation of air flow; a volute enclosing the impeller for direction of air flow from an axial air inlet of the volute past the impeller to a tangential air outlet of the volute; a vacuum tube for conducting dirty air flow to the air inlet of the volute in the vacuuming mode of operation; and a cyclonic separation arrangement for receiving dirty air flow from the air outlet of the volute, separating garden waste from said dirty air flow in the vacuuming mode of operation and expelling cleaned air flow.

The present invention avoids the use of a porous collection bag. Instead of removing garden waste by filtration, which progressively clogs the collection bag's pores and inhibits escape of air flow, the apparatus of the present invention removes the garden waste by cyclonic separation. Volumetric flow rate of air flowing through the apparatus remains generally constant as separated material accumulates in the cyclonic separation arrangement. Thus, an attraction of cyclonic separation is a consistent ability to pick up garden waste. Cleaned air flow can be directed to open atmosphere from the cyclonic separating apparatus rather than permeating the wall of a porous collection bag and risk dirtying, or wetting, the user's clothing. Also, rather than using one toroidal chamber for both enclosing the impeller and for cyclonic separation, the apparatus of the present invention splits these two functions between the volute and the cyclonic separating apparatus. This provides a more slender cyclonic separation arrangement as it need not accommodate its cyclonic separation around an impeller. Dirty air flows tangentially from the impeller and directly out the volute rather than being diverted in an axial direction and increasing turbulence and energy losses in the air flow. Cleaned air is expelled from the cyclonic separating apparatus rather than being recycled via the vacuum tube and diminishing the suction force at the tip of the vacuum tube.

The cyclonic separation arrangement may comprise one or more cyclones. A cyclone may have a hollow cylindrical cyclone body, conical cyclone body, frustro-conical cyclone body or a cyclone body with a combination of two or more such shapes. Dirty air enters a cyclone body via a tangential air inlet port and swirls around the cyclone in an outer vortex. Centrifugal forces move the garden waste outwards to strike the side of the cyclone body and separate it from the air flow. Garden waste is deposited at the bottom of the cyclone body. An inner vortex of cleaned air then rises back up the middle of the cyclone and is expelled either through an air outlet port at the top of the cyclone body or through an inner cylindrical air permeable wall leading to an air outlet port. Preferably, the cyclonic separation arrangement comprises: a cyclone having a hollow generally cylindrical cyclone body with a first longitudinal central axis; a tangential air inlet port through a side of the cyclone body to generate a vortex in the cyclone body with dirty air flow received from the air outlet of the volute; an air outlet port through a longitudinal end of the cyclone body for expelling cleaned air flow; and means for collecting garden waste separated from said dirty air flow by the cyclone, wherein the central axis of the cyclone body and an axis of rotation of the impeller are substantially coplanar. Having the axes of the cyclone and impeller in the same plane as each other provides certain advantages. Dirty air flowing tangentially from the impeller may be delivered directly and smoothly to the tangential air inlet port through the side of the cyclone which helps to minimise turbulence and energy losses in the air flow. The central axis of the cyclone is coplanar with the axis of the impeller and, as a result, may be aligned with other components such as the vacuum tube and hand-holdable unit as well This provides a more slender design of apparatus for collection of garden waste.

Garden waste may be collected inside the cyclone. The cyclone body may be openable, or removable, for emptying of garden waste collected therein. Preferably, the means for collecting garden waste comprises: a discharge nozzle through an opposite longitudinal end of the cyclone body; and a collection chamber arranged to collect garden waste from the discharge nozzle. As such, garden waste collection is performed outside the cyclone. The collection chamber provides the cyclonic separating apparatus with additional collection capacity which has the advantage of increasing the interval between emptying garden waste. It also provides flexibility in the design of the cyclone body so that it may be optimised for garden waste separation rather than being compromised by the need to collect garden waste as well.

Preferably, the discharge nozzle defines a plane inclined with respect to the central axis of the cyclone body. This helps to prevent separated garden waste from re-entry into the cyclone body after it has been discharged from the discharge nozzle.

Preferably, the collection chamber comprises a garden waste receptacle, wherein the receptacle is detachably connected to the cyclonic separating apparatus. Thus, garden waste sucked up in the vacuum mode of operation can be collected in the collection chamber and deposited elsewhere by detaching the receptacle, emptying it and replacing it as desired.

Preferably, the air outlet port is directed away from the vacuum tube and/or from a user holding the hand-holdable unit. Thus, cleaned air expelled from the cyclonic separating apparatus avoids disrupting collection of garden waste by the vacuum tube and diminishing the ability of the device to perform its vacuuming duties. Cleaned air expelled away from a user avoids dirtying dirty, or wetting, the user's clothing in the event some residual garden waste, or moisture, remains in the air flow after cyclonic separation.

Preferably, the vacuum tube is an elongate tube, wherein the cyclone comprises a frustro-conical portion tapering radially inwardly towards a second longitudinal end of the cyclone opposite to the first longitudinal end and wherein a side of the frustro-conical portion proximal to the vacuum tube is substantially parallel thereto. An elongate vacuum tube may collect garden waste at ground level without causing a user holding the apparatus to stoop. The internal diameter of the frustro-conical portion diminishes as the air flow approaches its longitudinal end. This accelerates the outer air flow vortex thereby increasing centrifugal forces and separating ever smaller garden waste particles and increasing the separation efficiency of the cyclone. The term "separation efficiency" relates to the relative ability of a cyclone to remove small particulate matter. For example, a high efficiency cyclone can remove smaller particulate matter from air flow than a low efficiency cyclone. Inclination of the cyclone body's central axis so that a side of the frustro-conical portion is substantially parallel to the vacuum tube takes space that may otherwise be unused. This makes the apparatus more compact.

Preferably, said proximal side of the frustro-conical portion contacts the vacuum tube. Thus, unused space between the frustro-conical portion and the vacuum tube is eliminated.

Preferably, the air outlet port comprises a hollow, substantially cylindrical vortex finder arranged within the cyclone body. The vortex finder may extend part way, or all way, along the internal length of the cyclone body. The vortex finder improves cyclonic separation by gathering an internal vortex of cleaned air within the cyclone body and directing it through the air outlet port of the cyclone.

Preferably, the air inlet port is arranged to circumscribe an angle of between 90 and 180 degrees about the circumference of the cyclone body. Thus, dirty air flow passing through the tangential air inlet port makes a gradual approach about the vortex finder. This helps to reduce instances of garden waste blockage between the vortex finder and the inside of the cyclone body.

In a second aspect of the present invention there is provided a blowervac comprising the apparatus for collection of garden waste of the first aspect, wherein the blowervac has a blowing mode of the operation and wherein the cyclonic separation arrangement is detachable permitting the connection of a blowing tube to the air outlet of the volute in place of the cyclonic separating arrangement in the blowing mode of operation. A blowervac has the advantage of extra versatility in that it is convertible between two modes of operation: blowing and vacuuming.

The blowervac may be provided with one or more different detachable volutes for use in the blowing and vacuuming modes of operation. For example, a single detachable volute may be used interchangeably with separable blowing and vacuum tubes. A volute can be prone to clogging when used for collecting garden waste which is wet. A removable volute may provide access to enable cleaning of both the fan and the volute if they become clogged during use of the device in the vacuuming mode of operation. In a preferred embodiment of the device according to the present invention, the blowervac comprises: a first attachment for removable engagement with the hand-holdable unit and comprising the volute for enclosing the impeller in the vacuuming mode of operation, the vacuum tube being in fluid communication with the air inlet of the volute and the cyclonic separation being in fluid communication with the air outlet of the volute; and a second attachment for removable engagement with the hand-holdable unit and comprising a second volute for enclosing the impeller in the blowing mode of operation and the blowing tube being in fluid communication with an air outlet of the second volute. The first and second attachments are interchangeable. They provide a simple means for the user to quickly and easily select between blowing and vacuuming operation of the blowervac. Further, an existing hand-holdable unit, for a blowervac comprising a bag for filtering garden waste, may be converted to the present invention by said first attachment for removable engagement with the hand-holdable unit.

Preferably, the second volute has a smaller interior volume than the first volute. This allows the weight of the second volute, which unlike the volute, does not have to accommodate the passage of garden waste therethrough, to be minimized, thereby reducing the overall weight of the blowervac in blowing mode.

For ease of packaging, storage and transportation of the blowervac, the first attachment may be separable into a portion comprising the first volute, a portion comprising at least part of the vacuum tube and/or a portion comprising the cyclonic separating apparatus and/or the second attachment may be separable into a portion comprising the second volute and a portion comprising at least a part of the blowing tube. Thus the components of the blowervac may be disassembled and stored in a small overall volume.

Preferably, the hand-holdable unit comprises an interlock mechanism for preventing operation of the motor when neither the first attachment nor the second attachment is engaged therewith. This prevents a user from being injured by operation of the impeller when it is exposed. Such an interlock mechanism is described, for example, in European patent publication No. 0 723 759 of Black & Decker Inc. Also to protect users from being injured by operation of the impeller, the air outlet of the volute may comprise an obstruction which allows the passage of mulched garden waste therethrough, but which prevents the insertion of a human finger into the volute sufficiently far to contact the impeller. If required, a similar obstruction may also be provided on the air outlet of the second volute, for example if this air outlet is exposed to a user by detachment of the blowing tube from the second volute. In a preferred embodiment, the air outlet of the volute or the second volute comprises a tube and the obstruction therein comprises one or more vanes formed on the inner surface of said tube and aligned with the longitudinal axis thereof. Such an embodiment has the advantage of preventing the insertion of a human finger into the volute, whilst also minimizing the resistance presented by the obstruction to the passage of air and possibly also garden waste through the air outlet.

BRIEF DESCRIPTION OF THE DRAWINGS

This and other features and advantages of the present invention will be better understood from the following detailed description, which is given by way of example and with reference to the accompanying drawings, in which:

FIGS. 7A to 7C show the view of FIG. 2 with progressive stages of the vacuuming mode of operation superimposed thereupon;

DETAILED DESCRIPTION OF THE INVENTION

Figure 1:
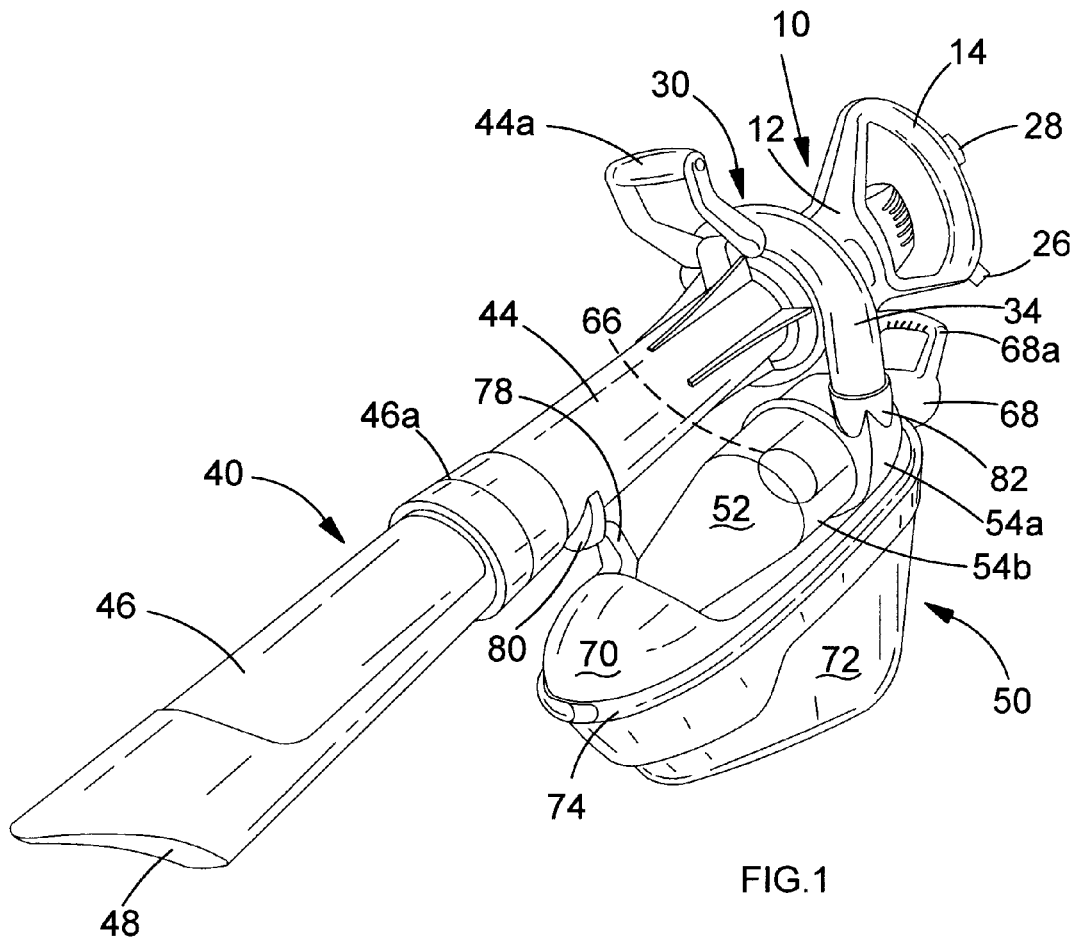
FIG. 1 shows a perspective view of an apparatus for collection of garden waste according to the present invention in a vacuuming mode of operation.

Referring to FIG. 1, there is shown an apparatus for collection of garden waste according to the present invention. The apparatus comprises a hand-holdable unit 10, a volute 30 attached to the hand-holdable unit, a vacuum tube 40 attached to the volute and a cyclonic separation arrangement 50 mounted below the volute and the vacuum tube.

Figure 2:
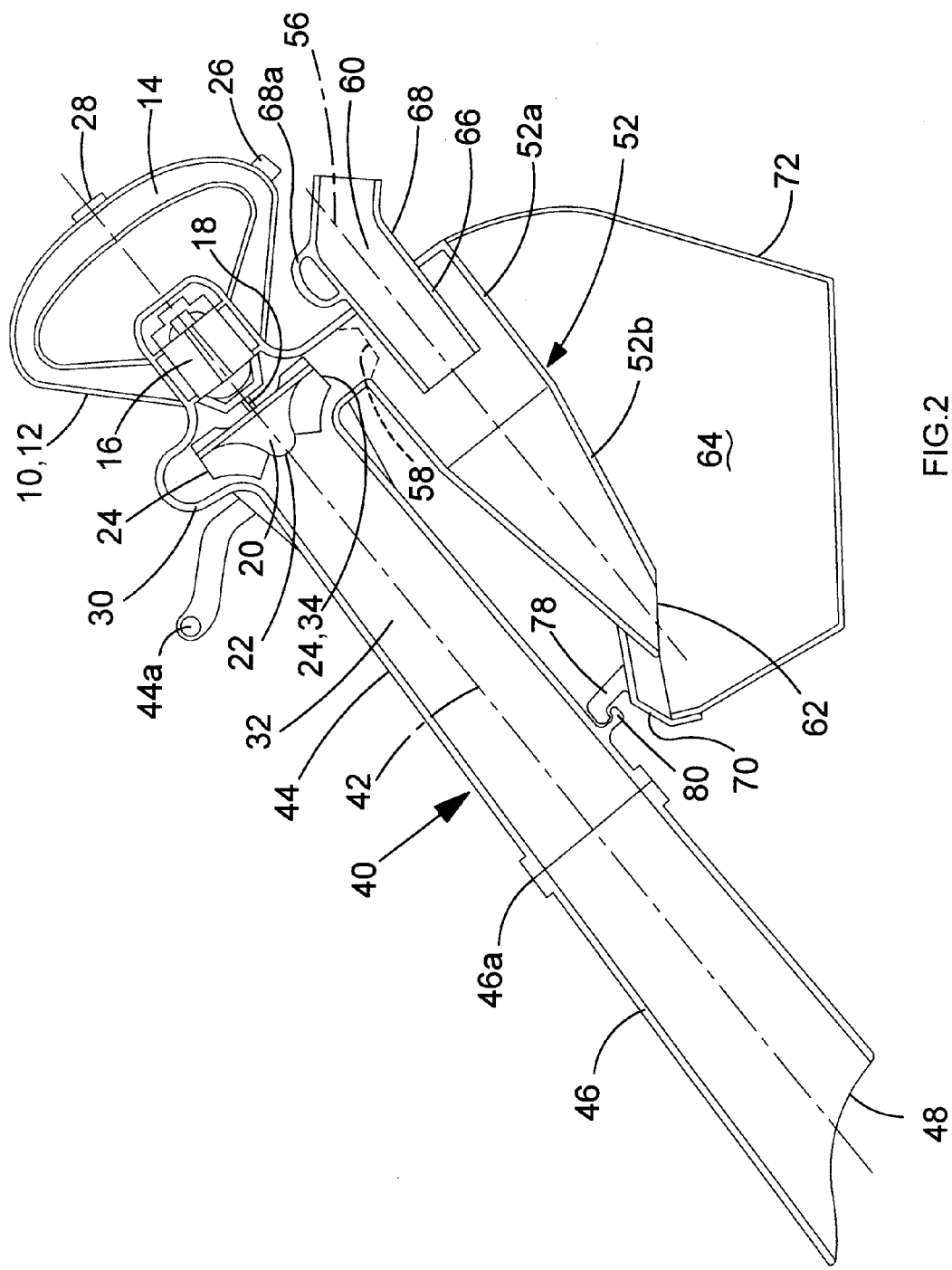
FIG. 2 shows a vertical cross-sectional view of the apparatus of FIG. 1.

Referring to FIGS. 1 and 2, the hand-holdable unit 10 comprises a body 12 with a handle 14 for grasping by the user. The body encloses a motor 16 with a drive shaft 18 coupled to a fan 20 for generating air flow. The fan is an impeller 20 with an axial input 22 facing away from the motor and a tangential output 24. The hand-holdable unit further comprises a power inlet 26 for attachment of a cable to supply mains electrical power and an on/off switch 28 for electrically coupling the motor to the mains electrical supply.

The volute 30 comprises a hollow body with a spiral-shaped interior which encloses the impeller 20 and directs air flow past the impeller. The volute is detachably connected to the hand-holdable unit 10. The volute has an axial air inlet 32 aligned with the axial input 22 of the impeller. The volute has a tangential air outlet 34 arranged tangentially to the impeller.

The vacuum tube 40 is an elongate hollow tube in fluid communication with the air inlet 32 of the volute 30. The vacuum tube has a longitudinal central axis 42 substantially co-axial with the motor drive shaft 18. The vacuum tube comprises an upper section 44 and a lower section 46 detachably connected to one end of the upper section. The opposite end of the upper section of the vacuum tube is connected to the volute 30 such that the upper section comprises the air inlet 32 of the volute. The upper section comprises a handle 44a for grasping by a user when the device is in vacuuming operation. The open end of the lower section of the vacuum tube comprises a nose 48 through which garden waste is collected up the vacuum tube when the apparatus is in vacuuming operation, as is explained in more detail below.

The cyclonic separation arrangement 50 comprises a cyclone 52 having a hollow generally cylindrical cyclone body 54 and a longitudinal central axis 56, an air inlet port 58 arranged tangentially through a side of the cyclone, an air outlet port 60 through a longitudinal end of the cyclone, a discharge nozzle 62 through an opposite longitudinal end of the cyclone and a collection chamber 64 connected to the discharge nozzle. The air outlet port comprises a hollow cylindrical vortex finder 66 located inside the cyclone body 54 and substantially co-axial with the cyclone central axis 56. The central axis 56 of the cyclonic separation arrangement 50 is orientated generally in line with the central axis 42 of the vacuum tube 40 and the drive shaft 18 of the impeller 20.

The cyclone 52 comprises a hollow cylindrical portion 52a and a frustro-conical portion 52b extending from the cylindrical portion. The cylindrical portion comprises the air inlet port 58 and the air outlet port 60 located at the longitudinal end of the cyclone body. The air inlet port 58 is in fluid communication with the air outlet 34 of the volute 30. The air outlet port 34 is in fluid communication with open atmosphere via an outlet pipe 68 located on the outside of the cyclone 52. The vortex finder 66 extends part way along the inside of the cylindrical portion 52a from the longitudinal end of the cyclone 52 and past the air inlet port 58. The frustro-conical portion 52b comprises the discharge nozzle 62 located at the opposite longitudinal end of the cyclone 52. The discharge nozzle 62 defines a plane inclined with respect to the cyclone central axis 56 by an angle in the range of from 30 to 60 degrees.

Figure 3:
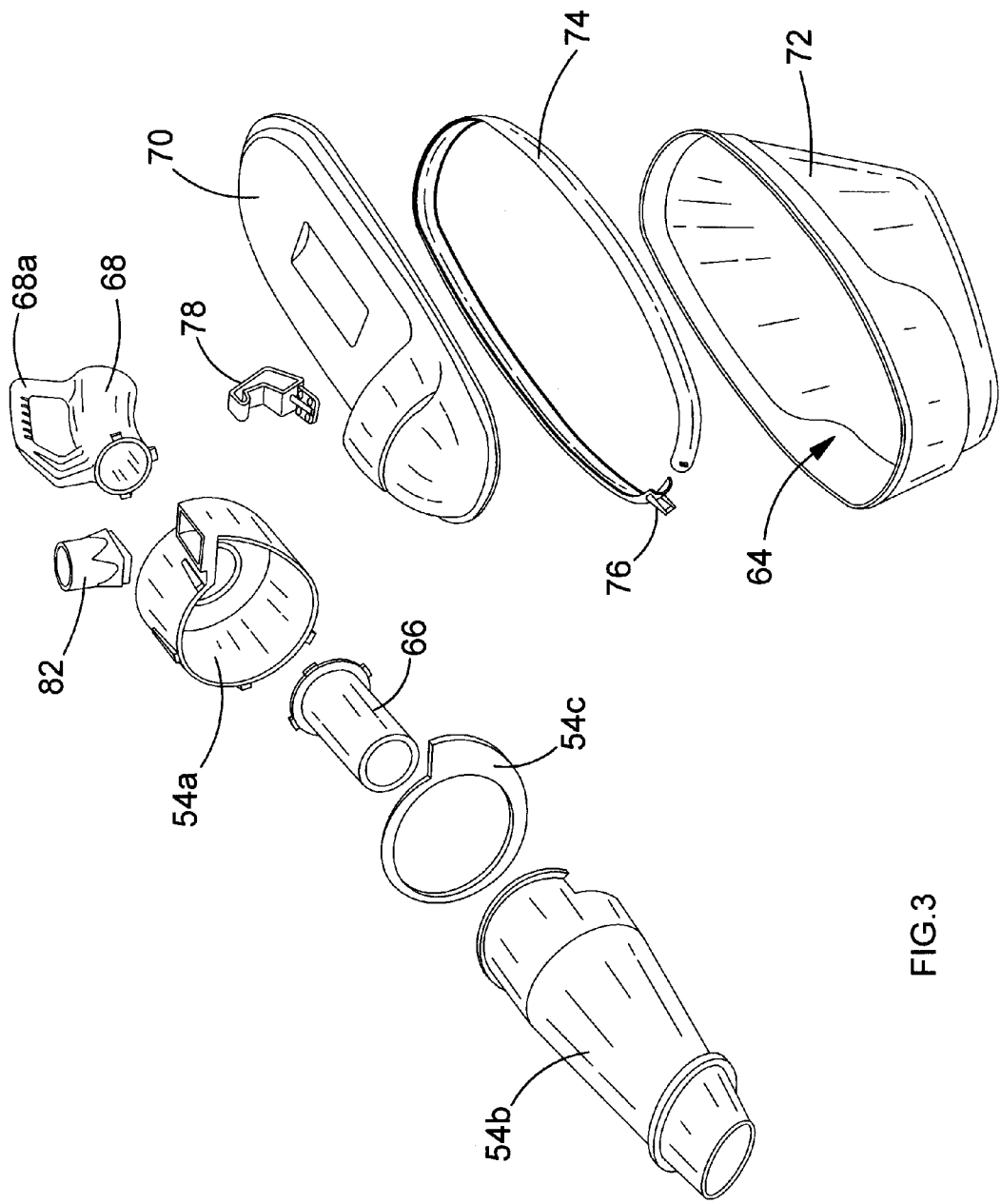
FIG. 3 shows an exploded perspective view of a cyclonic separation arrangement of the apparatus of FIG. 1.

As best shown in FIG. 3, the collection chamber 64 comprises a lid 70 and a non-porous garden waste receptacle 72 detachably connected to the lid in an air-tight manner by a lockable collar 74. The collar comprises a lock 76. The lock may be any quick-release item capable of locking and unlocking the two ends of the collar, like, for example, a buckle. The lid comprises a hook 78 for engagement with a corresponding hook 80 on the underside of the vacuum tube 40. The discharge nozzle 62 protrudes through the lid to deposit separated garden waste in the collection chamber, as is explained in more detail below. The receptacle is transparent so that a user may see when it is full of collected garden waste and needs emptying.

Referring to FIG. 3, the construction of the cyclonic separation arrangement 50 is described. The cyclone body 54 is assembled from three parts: a cap 54a connected to a cone 54b via an interconnecting piece 54c. The three cyclone body parts combine to form the cylindrical 52a and frustro-conical 52b portions of the cyclone 52. The air inlet port 58 comprises a short interconnecting tube 82 in fluid communication with the cyclone 52 via the cap 54a. The air inlet port 58 is arranged as a scroll about the vortex finder 66 as is described in more detail below. The interconnecting tube is detachably connected to, and in fluid communication with, the air outlet 34 of the volute 30.

The collection chamber 64 is mounted to the underside of the cyclone 52 by the lid 70. The cyclonic separation arrangement 50 is suspended from the vacuum tube 40 by detachable engagement between the lid hook 78 and the vacuum tube hook 80. Likewise, the cyclonic separation arrangement 52 is suspended from the volute 30 by detachable connection between the interconnecting tube 82 and the air outlet 34 of the volute 30. The outlet pipe 68 comprises a handle 68a for grasping by a user when the cyclonic separation arrangement is being detached from the vacuum tube and volute.

Figure 4:
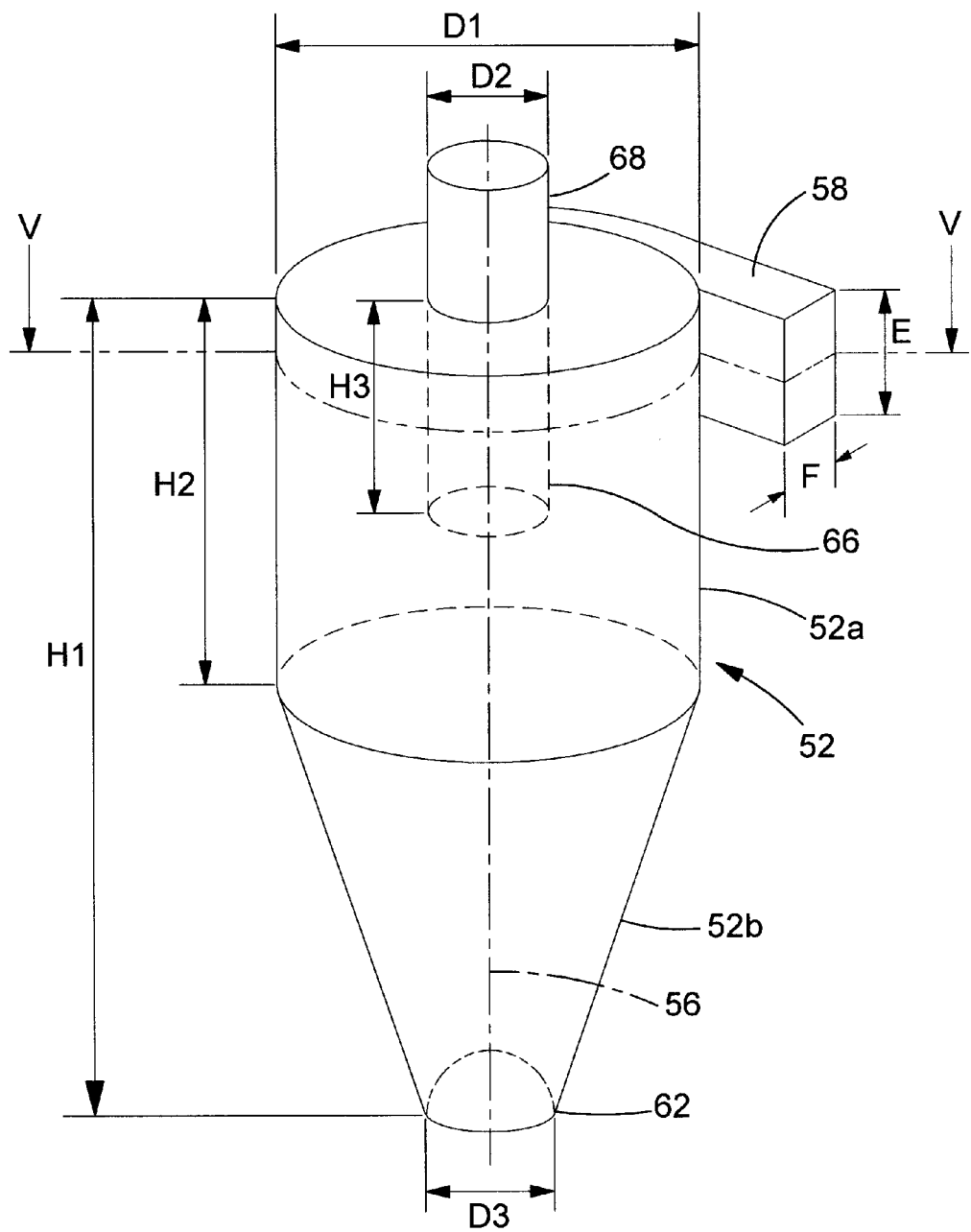
FIG. 4 shows the dimensions of a cyclone of the cyclonic separation arrangement.

The cyclone 52 of the cyclonic separation arrangement 50 is based on a general purpose design by Peterson & Whitby. The dimensions of the cyclone 52 are described with reference to FIG. 4. Diameter D1 of the cylindrical portion 52a of the cyclone is approximately the same as, or less than, the outer diameter of the volute 30 and falls within a range of 120 mm to 210 mm. A preferred diameter D1 is about 165 mm to achieve good cyclonic separation within the space available under the hand-holdable unit 10. Height E of the air inlet port 58 is 0.583 D1. Width F of the air inlet port 58 is 0.208 D1. Diameter D2 of the vortex finder 66 is 0.5 D1. Overall height H1 of the cyclone is 3.17 D1. Height H2 of the cylindrical portion of the cyclone is 1.33 D1. Diameter D3 of the discharge nozzle 62 is 0.5 D1. Length H3 of the vortex finder 66 is 0.583 D1.

Figure 5:
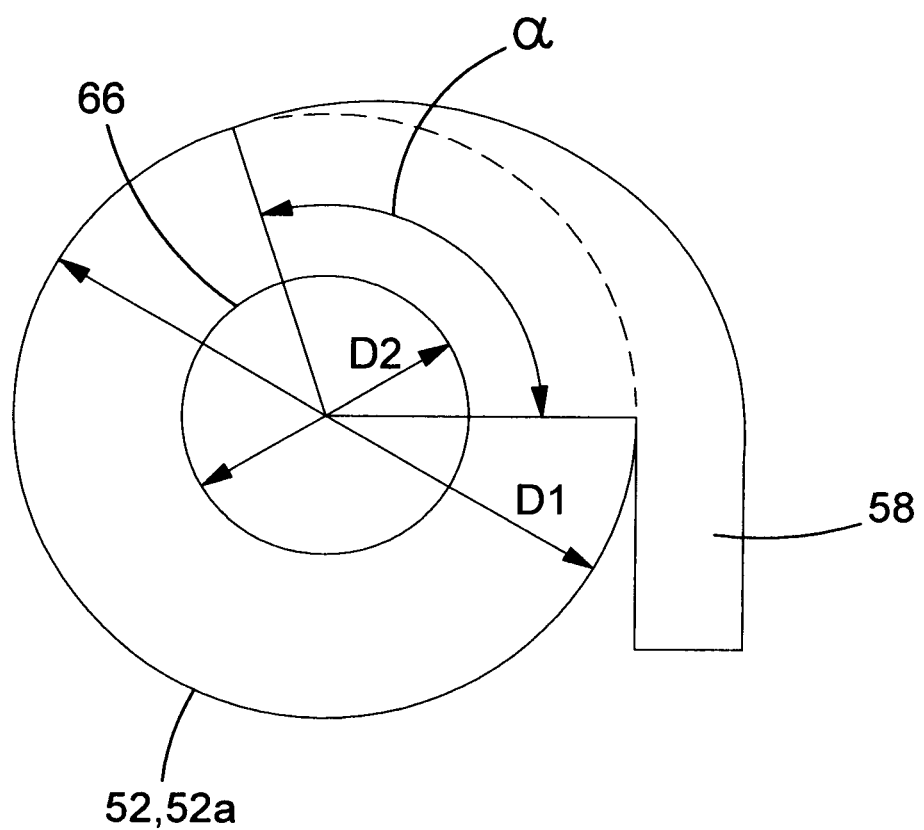
FIG. 5 shows a cross-sectional view V-V of the cyclone of FIG. 4.

Referring to FIG. 5, the air inlet port 58 to the cyclone 50 is arranged to circumscribe an angle α of between 90 and 180 degrees about the circumference of the cylindrical portion 52a of the cyclone body 52. The air inlet port is arranged in the manner of a scroll about the vortex finder. As such, dirty air flow can approach the vortex finder 66 gradually over a large sweep of the cyclone body.

Figure 6:
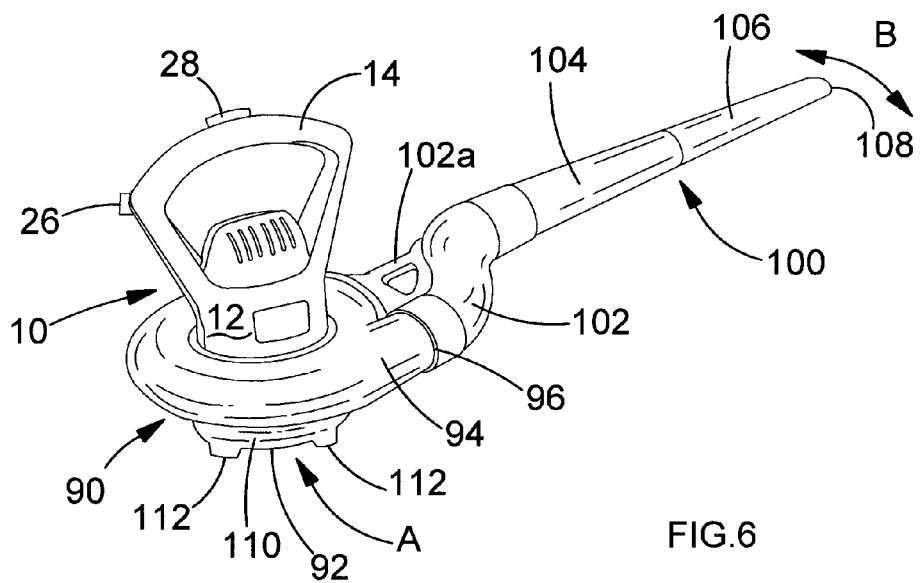
FIG. 6 shows a perspective view of the apparatus of FIG. 1 converted to a blowing mode of operation.

The apparatus for collection of garden waste W according to the present invention is convertible from vacuuming operation to a blowing operation for blowing garden waste W into piles for collection, like a blowervac. Referring to FIG. 6, there is shown the apparatus converted for the blowing mode of operation whereby the volute 30, the cyclonic separation arrangement 50 and the vacuum tube 40 have been detached from the hand-holdable unit 10 and substituted with a different second volute 90, a blowing tube 100 and a base 110, respectively.

The second volute 90 comprises a hollow body with a spiral-shaped interior which encloses the impeller 20 and directs air flow through the impeller. The volute is detachably connected to the hand-holdable unit 10. The second volute has an axial air inlet 92 aligned with the axial input 22 of the impeller. The second volute has a tangential air outlet 94 arranged tangentially to the impeller.

The blowing tube 100 is an elongate hollow tube in fluid communication with the air inlet 92 of the volute 90. The blowing tube has a longitudinal central axis arranged substantially perpendicular to the motor drive shaft 18. The blowing tube comprises a curved section 102 detachably connected at one end to an upper section 104 which is detachably connected to a lower section 106. The opposite end of the curved section of the blowing tube is detachably connected to the second volute 90. The curved section comprises a handle 102a for grasping by a user when the apparatus is in blowing operation.

The base 110 comprises feet 112 which provide the second volute 90 with some clearance on its underside and therefore allows the device to be rested on a horizontal surface in the configuration shown in FIG. 6 without the risk of foreign bodies accidentally entering the air inlet 92 of the second volute. To further protect the second volute, as well as to protect users from the impeller when it is in operation, the base comprises a grille (not shown) over the air inlet 32 of the second volute, the spacing of which is smaller enough to prevent insertion of a human finger.

In blowing operation, clean air flow is drawn from open atmosphere through the grille and the air inlet 92 of the second volute 90 on the underside of the device, in the direction of arrow A, and into the second volute under the influence of the rotating impeller 20. Next, the clean air flow is expelled by the rotating impeller 20 through the air outlet 94 of the second volute, down the blowing tube 100 and out the nose 108. As may be seen from FIG. 6, the blowing tube 20 is slightly tapered towards the nose end, in order to concentrate the air flow from the second volute 90 into a jet which is expelled from the nose of the blowing tube. This jet may be redirected by a user as desired by swinging the device back and forth in a horizontal plane as is indicated in FIG. 6 by double-headed arrow B.

Figure 7A:
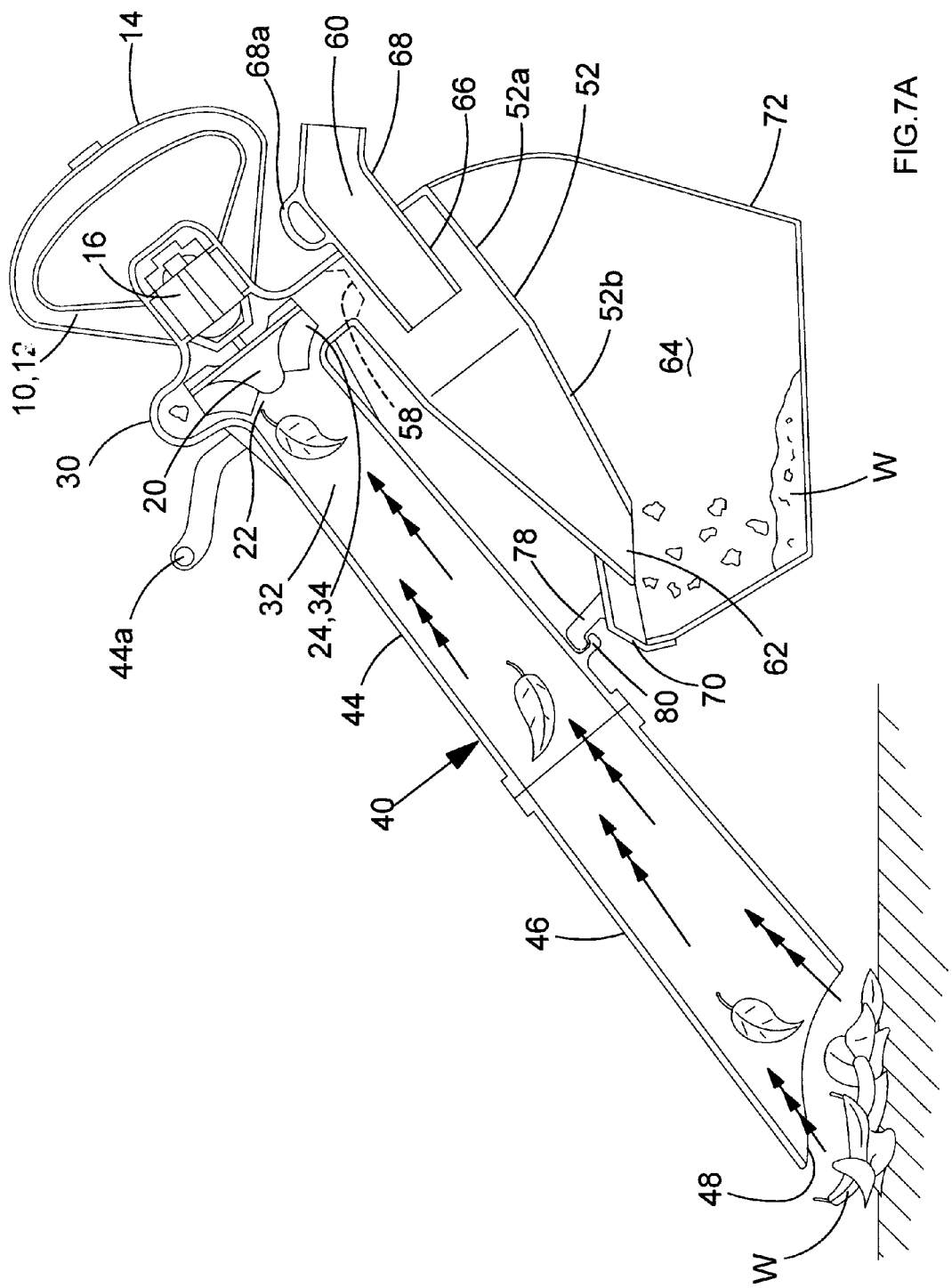
Figure 7C:
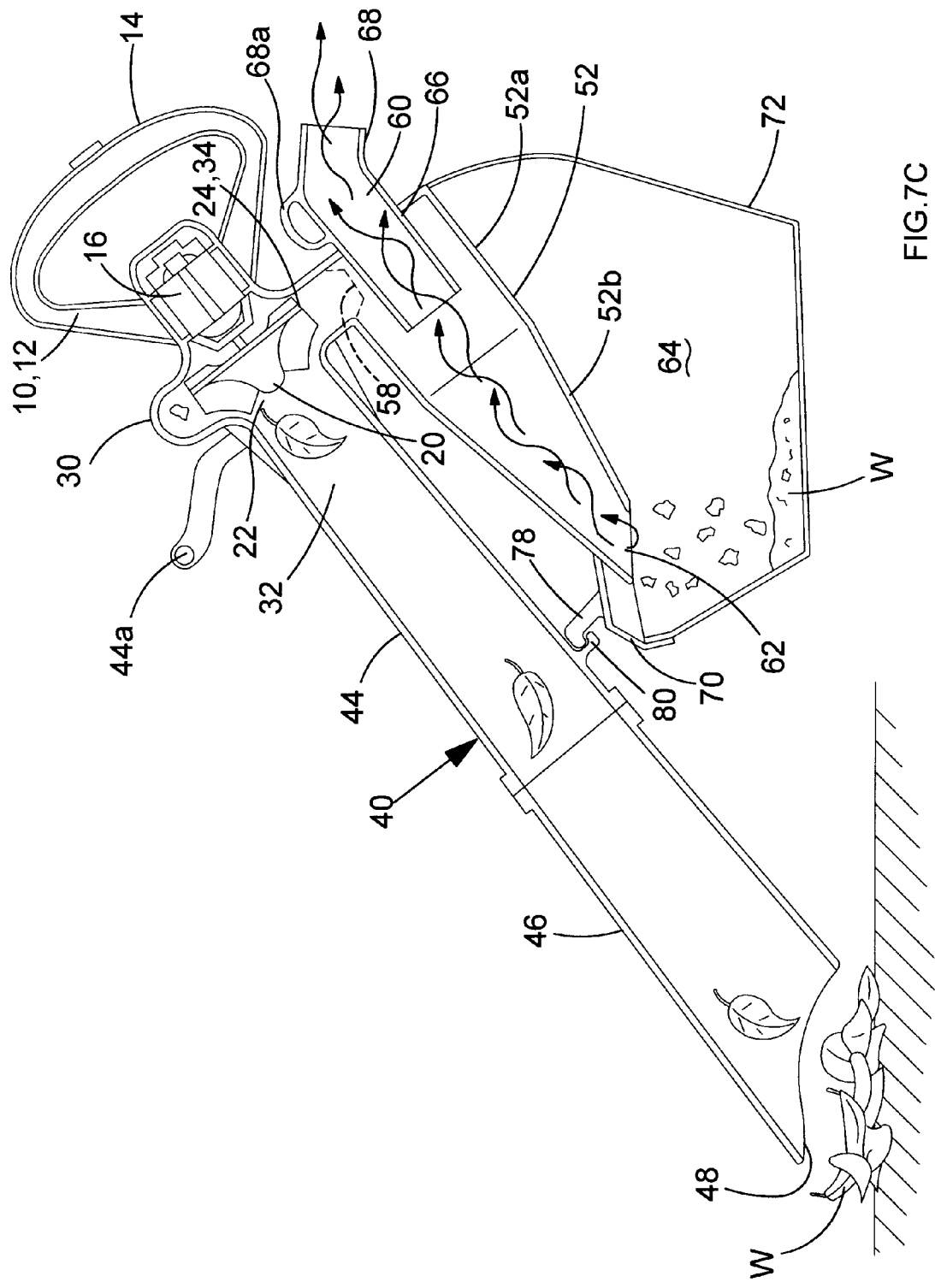

Operation of the apparatus for collection of garden waste in vacuuming mode is described with reference to FIGS. 7A to 7C. Dirty air flow (i.e. air and entrained garden waste W) is drawn from ground level, up the vacuum tube 40, through the air inlet 32 and into the volute 30, in the direction indicated by the triple-headed arrows, where the garden waste collides with, and is mulched by, the rotating impeller 20, as is shown in FIG. 7A. Next, the dirty air flow (i.e. air and mulched garden waste) is expelled tangentially by the rotating impeller 20 through the air outlet 34 of the volute 30, in the direction as indicated by the double-headed arrows, from where it is fed into the air inlet port 58 of the cyclone 52, as is shown by FIG. 7B. The air inlet port 58 directs the dirty flow in a helical path around the vortex finder 66. This creates an outer vortex inside the cyclone. Centrifugal forces move the mulched garden waste outwards to strike the inside of the cyclone and separate it from the air flow. The separated garden waste swirls towards the discharge nozzle 62. The internal diameter of the frustro-conical portion 52b of cyclone diminishes as the air flow approaches the discharge nozzle 62. This accelerates the outer helical air flow thereby increasing centrifugal forces and separating ever smaller garden waste particles. The garden waste particles exit the discharge nozzle to be deposited inside the collection chamber 64, as is also shown by FIG. 7B. Next, cleaned air flows back on itself to follow a narrow inner helical path through the middle of the cyclone 52, in the direction shown by the single-headed arrows. The cleaned air flows through the vortex finder 66 and out the air outlet port 60, as is shown by FIG. 7C. The outlet pipe 68 directs cleaned air flow away from the vacuum tube 40, and a user holding the hand-holdable unit 10, in case any fine garden waste particles, or moisture, remain in the cleaned air flow after cyclonic separation, as is also shown by FIG. 7C.

The volute 30 has a larger interior volume than the second volute 90 in order to accommodate garden waste with a reduced chance of clogging and is detachable from hand-holdable unit 10 by pulling hand-holdable unit and volute 30 in opposite directions. This allows easy access to both the impeller 30 and the interior of volute 30 for cleaning purposes in case they become clogged with garden waste. The second volute 90 is also detachable from the hand-holdable unit, by pulling the two in opposite directions, in order to convert the apparatus from blowing to vacuuming operation. The hand-holdable unit comprises an interlock mechanism which prevents operation of the motor 16 when neither volute 30 nor second volute 90 is engaged with hand-holdable unit. Thus, the impeller cannot be operated when it is exposed.

Returning to FIGS. 2 and 6, the lower section 46 of the vacuum tube 40 can be detached from the upper section 44 of the vacuum tube at a joint indicated by reference numeral 46a. The cyclonic separation arrangement can be detached from the volute 30 at a joint between the air outlet 34 and the short interconnecting tube 82. The curved section 102 of blowing tube 100 can be separated from the second volute 90 at the joint indicated by reference numeral 96. This allows the apparatus to be disassembled and stored without taking up a large amount of space.

The joint 46a is located sufficiently far from the volute 30 to make it impossible for a user to insert a finger into the volute 30 through the air inlet 32 when the impeller 20 is running. On the other hand, since the join between the air outlet 34 and the short interconnecting tube 82 is located closer to the volute 30 than the join 46a, the inner surface of the air outlet 34 is provided with several rigid vanes aligned with air flow direction in the air outlet. These form an obstruction allowing the passage of mulched garden waste therethrough, whilst also preventing a user from inserting a finger into volute 30 sufficiently far to contact the impeller. Likewise, the inner surface of the air outlet 94 of the second volute 90 is provided with several rigid vanes aligned with air flow direction through the air outlet for the same reasons. These form an obstruction allowing the passage of air flow therethrough, whilst also preventing a user from inserting a finger into the second volute 90 sufficiently far to contact the impeller.

Figure 8:
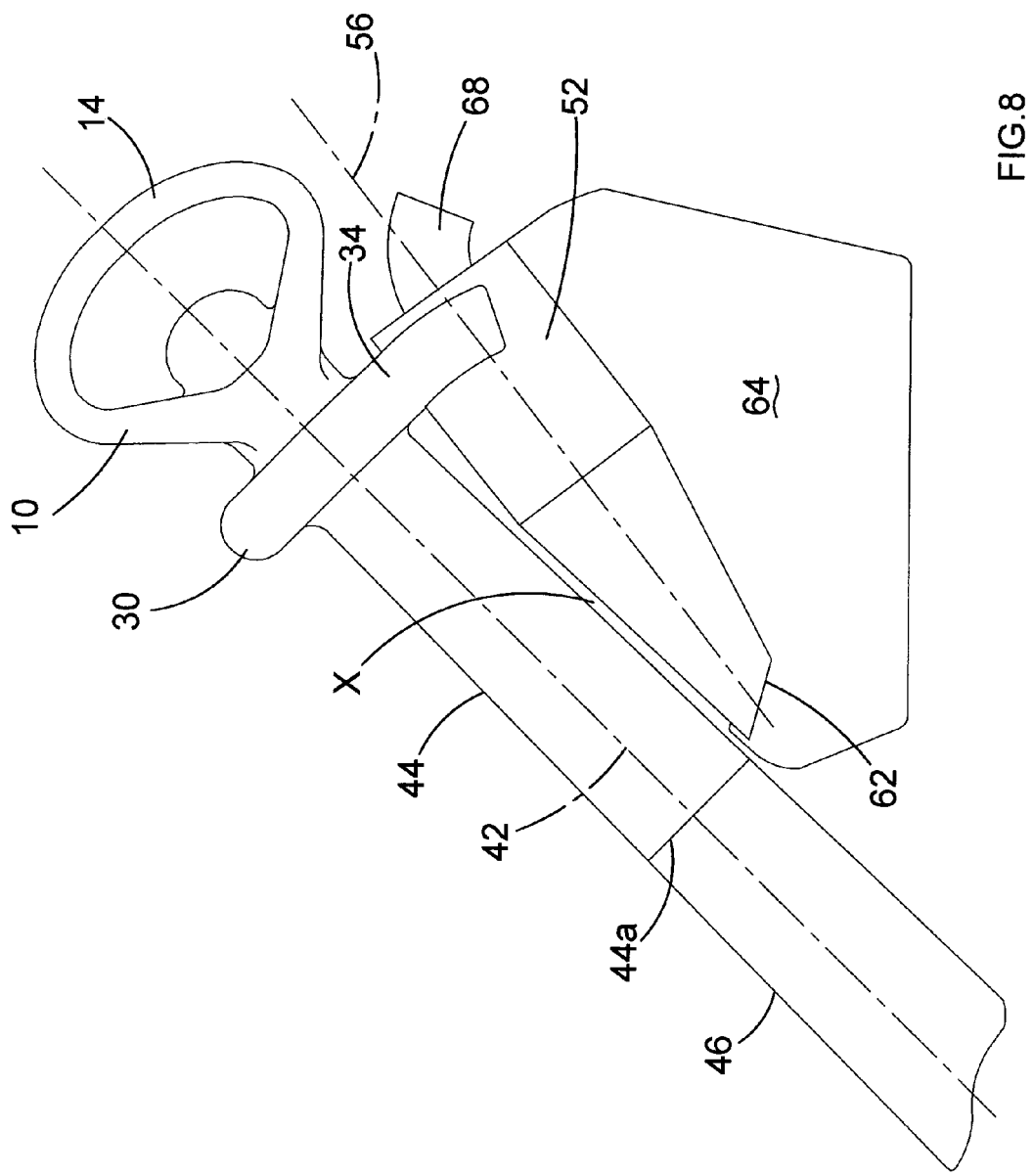
FIG. 8 shows a schematic view of the apparatus of FIG. 1 with a modification to the position of the cyclonic separation arrangement.

Referring to FIG. 8, there is shown a second embodiment of the apparatus for collection of garden waste with a modification to the layout of the cyclonic separation arrangement. The cyclone central axis 56 is inclined with respect to the vacuum tube central axis 42. A proximal side of the frustroconical portion 52b of the cyclone is parallel to the upper section 44 of the vacuum tube 40 to diminish the size of a gap X between the cyclone 52 and the vacuum tube 40. This causes the cyclone to occupy space that would otherwise be unused and makes the apparatus more compact. The gap X can be completely eliminated if the proximal side of the frustro-conical portion 52b is in contact with, or integral with, the upper section 44 thereby making the apparatus even more compact.

Figure 9:
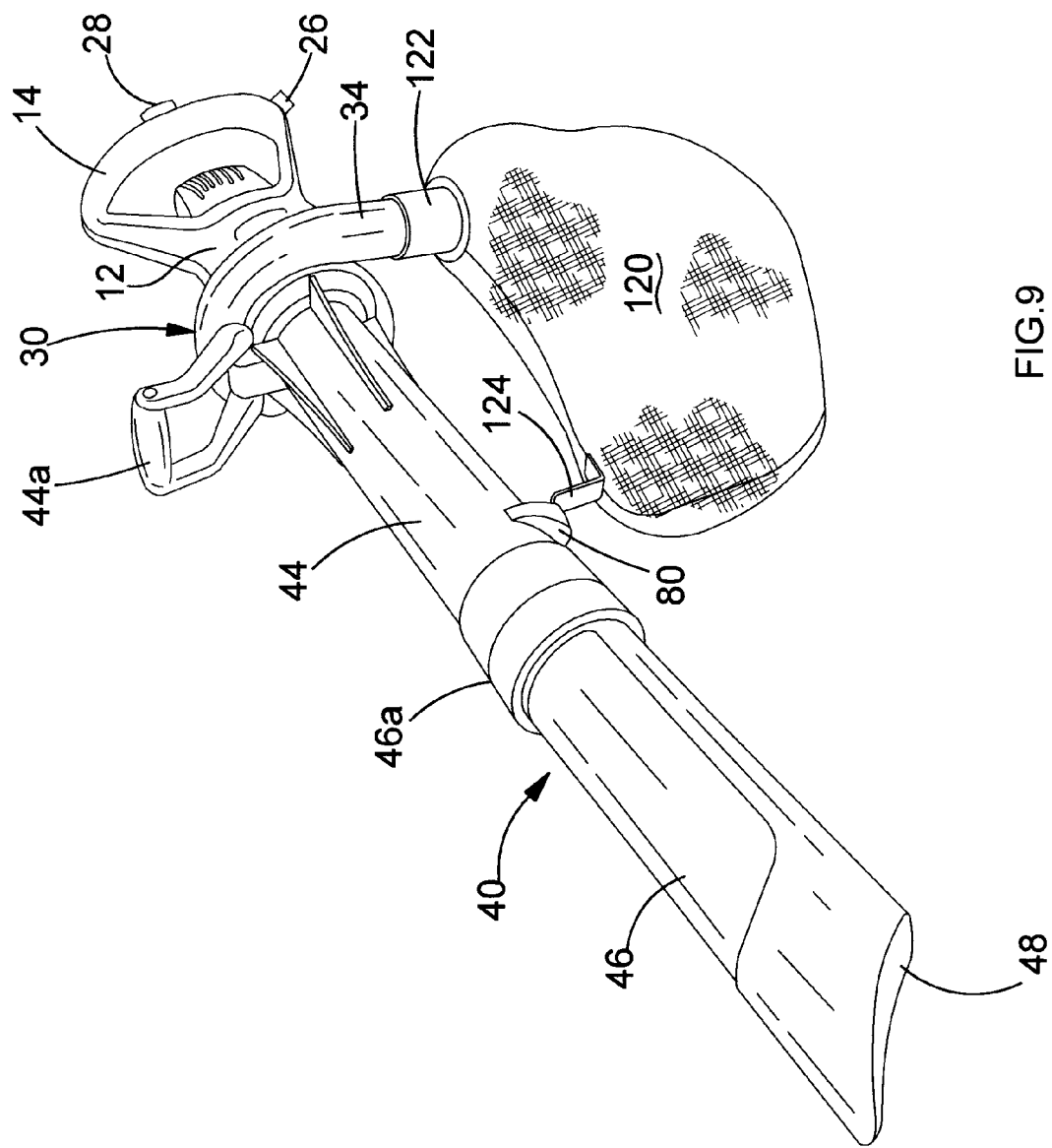
FIG. 9 shows a perspective view of the apparatus of FIG. 1 converted a vacuuming mode of operation with a bag filter.

Referring to FIG. 9, there is shown how the apparatus for collection of garden waste may be converted to a vacuuming mode of operation with a dirty fan and a nylon bag filter 120. All of the features of the apparatus (i.e. hand-holdable unit 10, impeller 20, volute 30, and vacuum tube 40) are unchanged from as described above. The sole modification is the substitution of the cyclonic separation arrangement with the bag filter 120. The air outlet 34 of the volute 30 feeds directly into an air inlet port 122 of the bag filter 120, which provides an air-porous receptacle for collecting garden waste once it has been mulched by the impeller 20 in vacuuming operation. The bag filter further comprises a hook 124 for engagement with the corresponding hook 80 on the underside of the vacuum tube 40. The bag filter is suspended from the vacuum tube 40 by detachable engagement between the bag hook and the vacuum tube hook. Likewise, the bag filter is suspended from the volute 30 by detachable connection between the air inlet port of the bag filter and the air outlet 34 of the volute 30. This enables the bag filter to be removed, emptied of garden waste and reattached, as required. The skilled person will appreciate that the interchangeability of the bag filter 120 and the cyclonic separation arrangement 50 allows a prior art apparatus to be converted to cyclonic separation.

The invention claimed is:

1. An apparatus for collection of garden waste (W) wherein the apparatus has a vacuuming mode of operation, the apparatus comprising:
    a hand-holdable unit comprising a motor with an output shaft coupled to an impeller for generation of air flow;
    a volute enclosing the impeller for direction of air flow from an axial air inlet of the volute past the impeller to a tangential air outlet of the volute;
    a vacuum tube for conducting dirty air flow to the air inlet of the volute in the vacuuming mode of operation;
    a cyclonic separation arrangement for receiving dirty air flow from the air outlet of the volute, separating garden waste from said dirty air flow in the vacuuming mode of operation and expelling cleaned air flow;
    wherein the cyclonic separation arrangement comprises:
    a cyclone having a hollow generally cylindrical cyclone body (54) with a longitudinal central axis;
    a tangential air inlet port through a side of the cyclone body to generate a vortex in the cyclone body with dirty air flow received from the air outlet of the volute;
    an air outlet port through a first longitudinal end of the cyclone body for expelling cleaned air flow;
    means for collecting garden waste (W) separated from said dirty air flow by the cyclone; and
    wherein the central axis of the cyclone body and an axis of rotation of the impeller are substantially parallel.

2. The apparatus as claimed in claim 1, wherein the means for collecting garden waste comprises:
    a discharge nozzle through an opposite longitudinal end of the cyclone body; and
    a collection chamber arranged to collect garden waste (W) from the discharge nozzle.

3. The apparatus as claimed in claim 2, wherein the discharge nozzle defines a plane inclined with respect to the central axis of the cyclone body.

4. The apparatus as claimed in claim 2, wherein the collection chamber comprises a garden waste receptacle, wherein the receptacle is detachably connected to the cyclonic separating apparatus.

5. The apparatus as claimed in claim 4, wherein the air outlet port is directed away from the vacuum tube and/or from a user holding the hand-holdable unit.

6. The apparatus as claimed in claim 1, wherein the vacuum tube is an elongate tube, wherein the cyclone comprises a frustro-conical portion tapering radially inwardly towards a second longitudinal end of the cyclone opposite to the first longitudinal end and wherein a side of the frustro-conical portion proximal to the vacuum tube is substantially parallel thereto.

7. The apparatus as claimed in claim 6, wherein said proximal side of the frustro-conical portion contacts the vacuum tube.

8. The apparatus as claimed in claim 1, the air outlet port comprises a hollow, substantially cylindrical vortex finder arranged within the cyclone body.

9. The apparatus as claimed in claim 8, wherein the air inlet port is arranged to circumscribe an angle ($\alpha$) of between 90 and 180 degrees about the circumference of the cyclone body.

10. The apparatus as claimed in claim 1, wherein the cyclonic separation arrangement is detachably secured to the vacuum tube.

11. An apparatus for collection of garden waste (W) wherein the apparatus has a vacuuming mode of operation, the apparatus comprising:
    a hand-holdable unit comprising a motor with an output shaft coupled to an impeller for generation of air flow;
    a volute enclosing the impeller for direction of air flow from an axial air inlet of the volute past the impeller to a tangential air outlet of the volute;
    a vacuum tube for conducting dirty air flow to the air inlet of the volute in the vacuuming mode of operation;
    a cyclonic separation arrangement for receiving dirty air flow from the air outlet of the volute, separating garden waste from said dirty air flow in the vacuuming mode of operation and expelling cleaned air flow;
    wherein the cyclonic separation arrangement comprises a cyclone having a hollow generally cylindrical cyclone body (54) with a longitudinal central axis, a tangential air inlet port through a side of the cyclone body to generate a vortex in the cyclone body with dirty air flow received from the air outlet of the volute, an air outlet port through a first longitudinal end of the cyclone body for expelling cleaned air flow, means for collecting garden waste (W) separated from said dirty air flow by the cyclone, and wherein the central axis of the cyclone body and an axis of rotation of the impeller are substantially parallel; and
    wherein the apparatus has a blowing mode of operation and wherein the volute, cyclonic separation arrangement and vacuum tube are detachable from the hand-holdable unit permitting the connection of a second volute and blowing tube for the blowing mode of operation.

12. The apparatus as claimed in claim 11, wherein the second volute has a smaller interior volume than the first volute.

13. The apparatus as claimed in claim 11, wherein the hand-holdable unit comprises an interlock mechanism for preventing operation of the motor when neither the first volute nor the second volute is engaged therewith.

14. The apparatus as claimed in claim 11, wherein the cyclonic separation arrangement is detachably secured to the vacuum tube.

* * * * *